March 10, 1931. L. KAISER 1,795,863
PROPELLER FOR AIRCRAFT
Filed Nov. 23, 1929 3 Sheets-Sheet 1

Inventor
L. Kaiser

March 10, 1931. L. KAISER 1,795,863
PROPELLER FOR AIRCRAFT
Filed Nov. 23, 1929 3 Sheets-Sheet 2

Inventor
L. Kaiser

March 10, 1931. L. KAISER 1,795,863
PROPELLER FOR AIRCRAFT
Filed Nov. 23, 1929 3 Sheets-Sheet 3

Inventor
L. Kaiser

Patented Mar. 10, 1931

1,795,863

UNITED STATES PATENT OFFICE

LAWRENCE KAISER, OF MILWAUKEE, WISCONSIN, ASSIGNOR OF ONE-HALF TO OSCAR C. PIPER, OF MILWAUKEE, WISCONSIN

PROPELLER FOR AIRCRAFT

Application filed November 23, 1929. Serial No. 409,290.

This invention relates to improvements in propellers for aircraft.

One of the objects of my invention is the provision of an improved propeller for use on various types of aircraft, wherein the blades of the propeller can be quickly and easily adjusted for varying the force exerted by the propeller and thus increasing or decreasing the pitch of the propeller with respect to its longitudinal axis.

Another object of the invention is the provision of a propeller construction for aircraft wherein the blades of the propeller are mounted for rotation in the hub of the propeller and manually operated means is provided for independently rotating the blades and retaining said blades in various adjusted positions.

A further object of the invention is the provision of a propeller of the above type wherein the construction and mounting of the hub and the blades is so arranged that the parts can be quickly and readily assembled onto the drive shaft of the motor, or easily removed therefrom and any of the parts can be quickly and easily replaced when necessary.

With the above and other objects in view, the invention consists in the novel features of construction, the combination and arrangement of parts hereinafter more fully set forth, pointed out in the claims and shown in the accompanying drawings wherein:

Figure 1 is a sectional view on the line 1—1 of Figure 4;

Figure 2 is a sectional view on the line 2—2 of Figure 5;

Figure 3 is a detail section on the line 3—3 of Figure 1;

Figure 4:
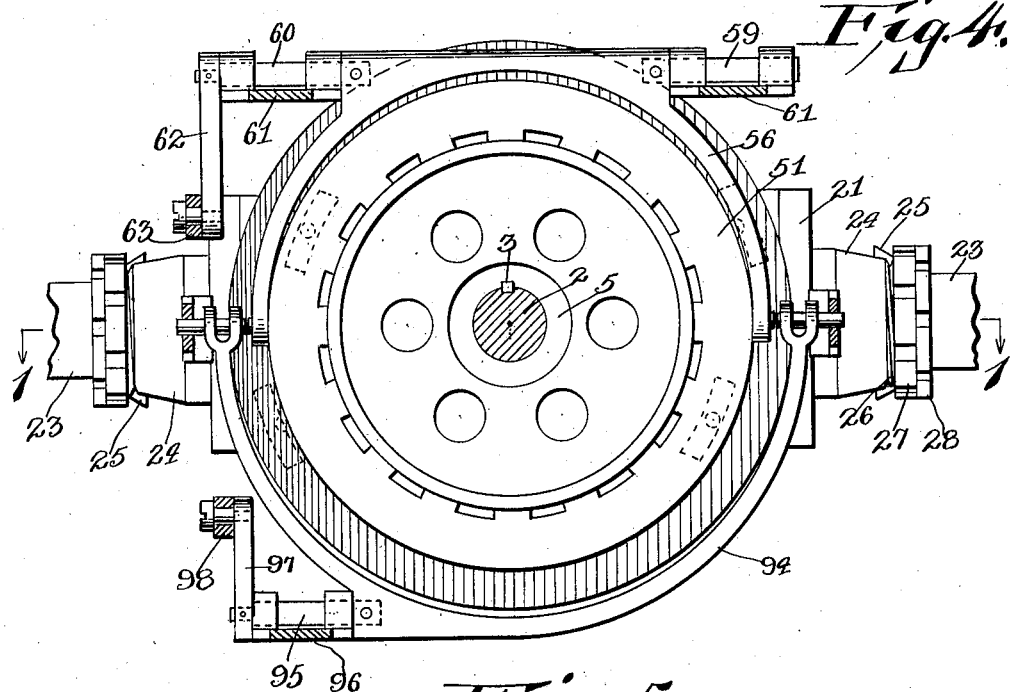
Figure 4 is a sectional view on the line 4—4 of Figure 1.

Referring more particularly to the drawings, 1 indicates a portion of the motor which has projecting therefrom the drive shaft 2. This drive shaft, as indicated, tapers outwardly and is provided with a longitudinal key 3 and screw threaded at its outer end, as shown at 4. Arranged over the shaft 2 is a sleeve 5, provided intermediate its ends with an annular rib 6 and at its outer end it is formed with a counter bore 7. Between the counter bore and the tapered portion of the sleeve 5 which receives the shaft 2, a threaded bore 8 is provided. The sleeve 5 is likewise provided with a longitudinal groove adapted to receive a key 3, so that the housing will rotate with the shaft 2.

Surrounding the shaft sleeve 5 is a casing 9 formed in its inner wall with an annular shoulder 10 which is adapted to abut against the exterior of the flange 6 and offset from this shoulder 10 is a flange 11 which is adapted to engage over the inner face of the flange 6, as shown in Figure 1. The outer wall of the housing 9 is also provided with a centrally disposed opening and formed with a shoulder 12 and an angular flange 13. The outer portion of the angular flange 13 surrounds the outer end of the sleeve 5 as illustrated when the casing 9 is mounted upon the housing.

In order to retain the casing 9 in position upon the sleeve 5, a sleeve 14 is fitted into the counter bore 7 and engages an annular shoulder formed on the retaining member 15. This retaining member 15 is provided with an annular threaded portion, threaded interiorly and exteriorly with the threads on the interior thereof adapted to engage the screw threaded portion 4 on the shaft 2, while the threads on the exterior thereof engage the threaded bore 8 of the sleeve 5, thus retaining the sleeve 5 upon the shaft 2.

The sleeve 14 is provided with an annular flange 16, the outer edge of which rests upon the horizontal portion of the angular flange 13 and abuts the shoulder 12 so as to properly maintain the casing 9 in its respective position relative to the sleeve 5.

The retaining member 15 is provided with a reduced outwardly projecting threaded portion 17 which extends into the sleeve 14 and threaded onto this member 15 is a locking nut 18. The inner end of the sleeve 14 is provided with an inwardly extending annular flange 19 and between this flange and the nut 18, a yieldable gasket is provided, as shown at Figure 1.

The above construction securely attaches the sleeve 5 to the shaft 2 and also retains the casing 9 in position upon the sleeve 5.

The outer ends of the casing 9 are exteriorly threaded, as shown at 20, and mounted thereon is an angular ring 21 retained in position by means of a locking nut 22. The blades 23 of the propeller are mounted in each end of the casing 9 and these blades are preferably secured to a head 24 with the inner end of each blade extending into the head, as shown at the right in Figure 1. Each propeller carries upon opposite sides thereof a bevel face cam 25 and removably mounted upon the outer threaded end 26 of each head 24 is a retaining ring 27 having a bevel surface adapted to cooperate with the bevel cams 25. These rings 27 are securely locked in position by means of the lock nuts 28.

The heads 24 are provided at their inner ends with enlarged annular members 29 which fit snugly within the ends of the casing 9, as shown in Figure 1, and I provide the heads with annular bearing surfaces 30 which are disposed within the casing 9 at the outer ends thereof. Between the bearing surfaces 30 and the casing 9, ball bearings 31 are retained. These ball bearings 31 are retained within the casing by means of the inwardly projecting flange part of the retaining ring 21. Attached to the inner end of each of the head members 24 is a housing 32 which extends inwardly to the shaft sleeve 5 and is provided with an annular bearing surface 33, upon which is mounted a bearing ring 34. Arranged adjacent the annular offset part 35 on the casing 9 is a bearing ring 36, and arranged in opposed relation with the bearing ring 34 and positioned between these two bearing rings are the roller bearings 37. From this, it will be apparent that the propeller blades and their mountings are supported within the casing 9 by the ball bearings 31 and the roller bearings 37.

Adjacent the annular bearing surfaces 33 is a brake drum 38, and adjacent the brake drum is a gear segment 39 adapted to mesh with a longitudinal movable rack 40, slidably mounted in an offset portion 41 of the casing 9. At this time, it might be well to call attention to the fact that the casing 9 is formed of two separable parts and is fitted over the shaft sleeve 5, but the clamping rings 21 are set in position upon the ends of the casing for retaining the heads 24 in place, although the openings in the opposed side walls of the casing 9 will permit the casing to be fitted over the end of the shaft sleeve 5 after the propeller blades have been fitted in the ends of the casing.

Each housing 32 is provided at its intermediate portion with a restricted annular portion 42, leaving an opening at the central portion of the housing. This restricted flange portion 42 has a cup-shaped bearing surface 43 to receive the bearing member 44. The housings 32 are connected to the shaft 2 for rotation therewith by extending a rod 45 transversely through the outer end of the shaft 2, through the member 15 and through the shaft sleeve 5, as shown in Figure 1, with the ends of this rod projecting into the housings 32 to a point adjacent the outer ends thereof. Mounted upon the ends of the rods 45 are the spiders 46 which carry roller bearings 47 adapted to ride upon the bearing member 44. A retaining nut 48 is mounted upon the ends of rod 45 and retains the roller bearings 47 in position. The nuts 48 are retained in position by means of the lock nuts 49 upon the ends of rod 45. From the foregoing, it will be apparent that the propeller blades 23 are securely mounted upon shaft 2 for rotation therewith, but move independently thereof. In other words, the propeller blades 23 are mounted for rotative movement at right angles to the axis of shaft 2 so that the angular pitch of the propeller blades may be varied at the will of the operator.

Surrounding the shaft sleeve 5 is an annular housing 50 and slidably mounted upon this housing 50 is a ring 51 provided with an annular raceway 52 in which the block 53 is movable.

The outer wall of the raceway is provided with a restricted annular slot 54 in which the rods 55 are movable. The rods 55 are extended outwardly to the casing 9 and are connected to the rack bars 40 which cooperate with the rack segments 39 on housings 32. From this, it will be apparent that as the casing 9 rotates with the shaft 2, the blocks 53 will ride around in the race-way 52 during the rotation of the propeller.

A yoke 56 engages over a portion of the ring 51, as shown in Figure 4, and has its ends slotted to engage the pins 58 carried by the ring. This yoke 56 has its intermediate portion attached to a rotatable stub shaft 59, and a rotatable shaft 60, each shaft being mounted upon an arm 61 which is carried by the main portion of the motor 1. The outer end of shaft 60 has attached thereto a link 62 which in turn is pivotally connected to a control lever 63, whereby the reciprocation of the control lever 63 will rotate shaft 60 and impart a rocking movement to yoke 56 and slide the ring 51 upon the housing 50. This movement will reciprocate the racks 40 and impart a rotative movement to housings 32.

Arranged upon opposite sides of the brake housing 38 with each housing 32 are the brake members 64 and 65, each of said brake members carrying a lining portion 66 which is adapted to engage the exterior face of the brake drums 38.

Figure 5:
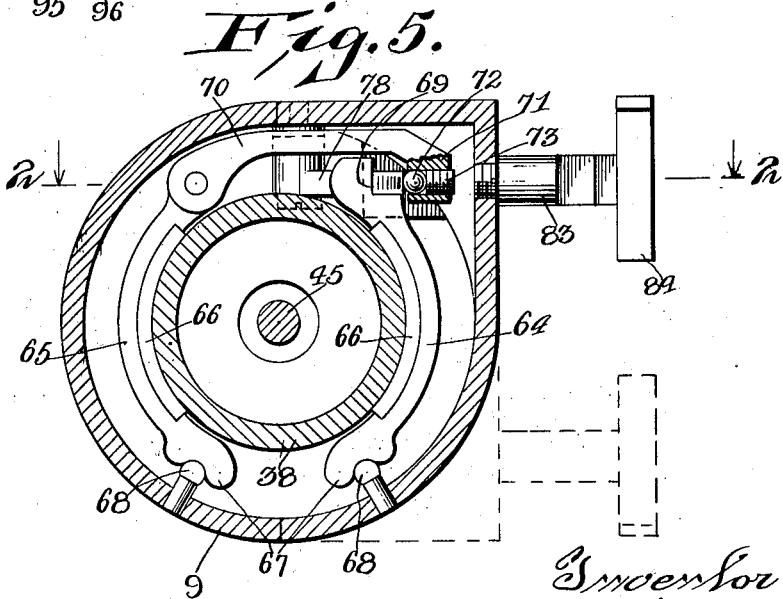
Figure 5 is a detail section on the line 5—5 of Figure 1.
Figure 6:
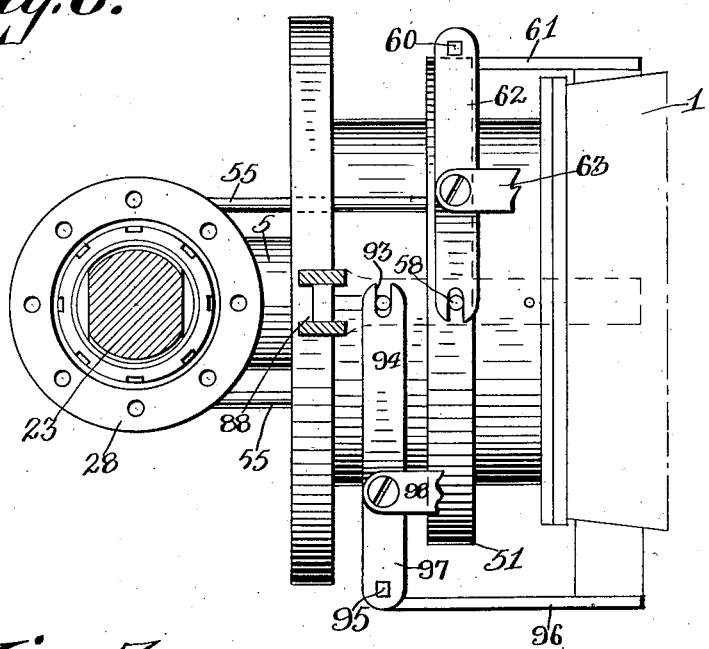
Figure 6 is a sectional view on the line 6—6 of Figure 1.
Figure 7:
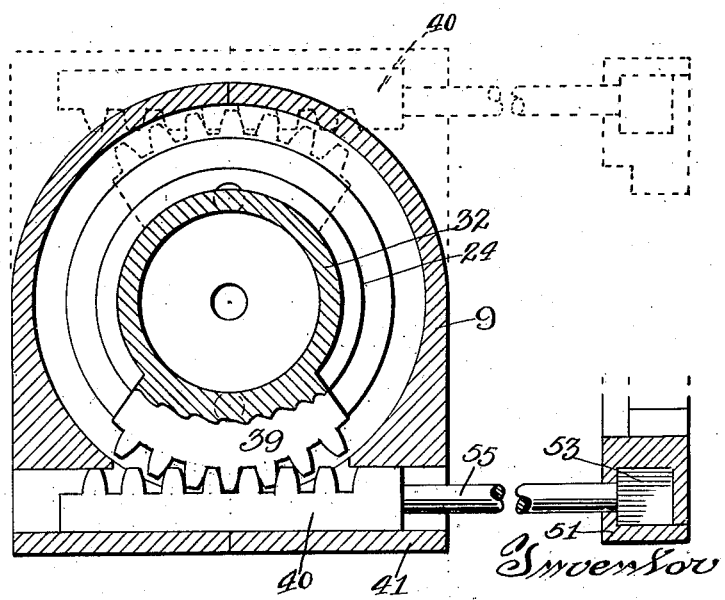
Figure 7 is a sectional view on the line 7—7 of Figure 1.

Each brake member 64 and 65 is provided with a bearing part 67 which is rockably mounted upon a support 68. The opposed end of bearing member 64 is provided with an angular seat 69, while the other bearing member 65 has pivoted to its substantially free end an arm 70 which has an offset portion 71 provided with an interiorly threaded aperture. Positioned within the aperture in the offset 71 is a bearing ball 72 retained in position by means of the threaded stop member 73. This bearing ball 72 is disposed opposite one side wall of the angular seat 69 and movable between one side wall of the seat 69 and of ball 72 is a tapered wedge member 74, slidably mounted within a bearing part 75 and provided in its upper face with an arcuate seat 76 in which is seated the rounded end 77 of an arm 78 mounted on shaft 79. This shaft 79 is supported by the casing 9, as shown in Figure 2, and carries a second arm 80 having a rounded end 81 adapted to fit within an arcuate recess 82 in rod 83. It will be apparent from the foregoing that upon sliding movement of the rod 83, the wedge member 74 will be forced between the bearing ball 72 and one wall of the angular seat 69, moving arm 70 to the right, as shown in Figure 5, clamping the brake member 64 as well as the brake member 65 tightly against the drum 38.

This braking mechanism is preferably used for securely maintaining the propeller blades in their adjusted positions and also has a tendency to drag upon the housings 32, while the propeller blades are being adjusted, so that an accurate adjustment of these blades can be effected.

The rods 83 extend outwardly through the inner wall of the casing 9 and are provided with shoes or blocks 84 which ride within an annular raceway 85 in ring 86. This ring 86 is supported by means of arms 87, the outer ends of which are provided with guide ways 88 in which are slidably mounted the lateral projecting lugs 89 on ring 86.

Extending outwardly from the ring 86 and removably attached to the lugs 89 are the pins 90 which are provided at their outer ends with cross portions 91 which project into a restricted slot 92 in each of the arms 87 for guiding the movement of pin 90 and also limiting the movement of ring 86. The cross portions 91 also extend into the slotted ends 93 of the yoke 94 which is attached to a shaft 95 carried by arm 96. The shaft 95 has attached to its outer end a link 97 connected to a control lever 98. From this, it will be apparent that upon reciprocation of the control lever 98, rotative movement is imparted to shaft 95 which will rock the yoke 94 and impart movement to the pins 90 and impart a lateral movement to ring 86 for actuating rods 83 and wedge members 74.

From the foregoing description taken in connection with the accompanying drawings, it will be apparent that my improved brake adjusting mechanism will be operated as follows:

When it is desired to adjust the pitch of the angle of the blades 23, the lever 98 is actuated for releasing the brake members 64 and 65. However, the movement of the brake member 64 will be slow so as to leave this member drag on the brake drum. After the brake members have been released, the lever 63 is then actuated to move ring 51 outwardly on the housing 50. This movement reciprocates the rack bars 40, rotating housings 32 which in turn will impart a similar movement to the blades 23. After the adjustment of the blades had taken place, the ring 86 is again adjusted through the movement of operating lever 98, and the clutch members 64 and 65 tightly engage with the drum 38 so that this action of the clutch members, together with the stationary position of the racks 40 will securely hold the blades 23 in their adjusted position.

Attention is also directed to the fact that by providing the thrust bearing on rod 45 at each end thereof, it will assist in maintaining the housings 32 in their proper position within the casing 9, so that the blades 23 will also be maintained in their restricted position relative to the shaft 2.

I claim:

1. In a propeller mounting, the combination with a driving shaft, a casing removably mounted thereon and connected thereto, propeller blades mounted in the casing for rotative movement independent of the movement of the driving shaft, housings within said casing operatively connected with the propeller blades, gear segments carried by said housings, rack bars operatively connected with the gear segments, a stationary sleeve surrounding the driving shaft, a ring slidably mounted upon said stationary sleeve and having a raceway, blocks slidably mounted in said raceway, rods connecting the rack bars and blocks, manually controlled means connected to the ring for adjusting the same on the stationary sleeve for imparting movement to said blades, and manually controlled braking means for retaining said blades against rotative movement and impeding their movement during adjustment.

2. In a propeller mounting, the combination of a driving shaft, a casing removably mounted upon said shaft and operatively connected thereto, blade members rotatably mounted in the casing at right angles to the driving shaft, manually controlled means for rotatably adjusting said blades independent of the movement of the shaft and manually controlled braking mechanism for retarding the movement of said blades.

3. In a propeller mounting, the combination with a driving shaft, a casing removably mounted on the shaft and operatively connected thereto, head blocks rotatably mounted in the casing, propeller blades having their inner ends mounted in said head blocks, means for removably securing the propeller blades in the head blocks and manually controlled means operatively connected with the head blocks for rotatably adjusting the blades independent of the movement of the shaft, and manually controlled braking mechanism for retarding the movement of said head blocks.

4. In a propeller mounting, the combination of a driving shaft, blade members disposed at right angles to the shaft and operatively connected thereto, means for adjusting the pitch of the blades independent of the movement of the shaft, and braking means for retarding the movement of said blades and retaining them in an adjusted position.

In testimony that I claim the foregoing I have hereunto set my hand at Milwaukee, in the county of Milwaukee and State of Wisconsin.

LAWRENCE KAISER.